H. F. SMITH.
DISH WASHING MACHINE.
APPLICATION FILED DEC. 6, 1911.
1,020,932.
Patented Mar. 19, 1912.
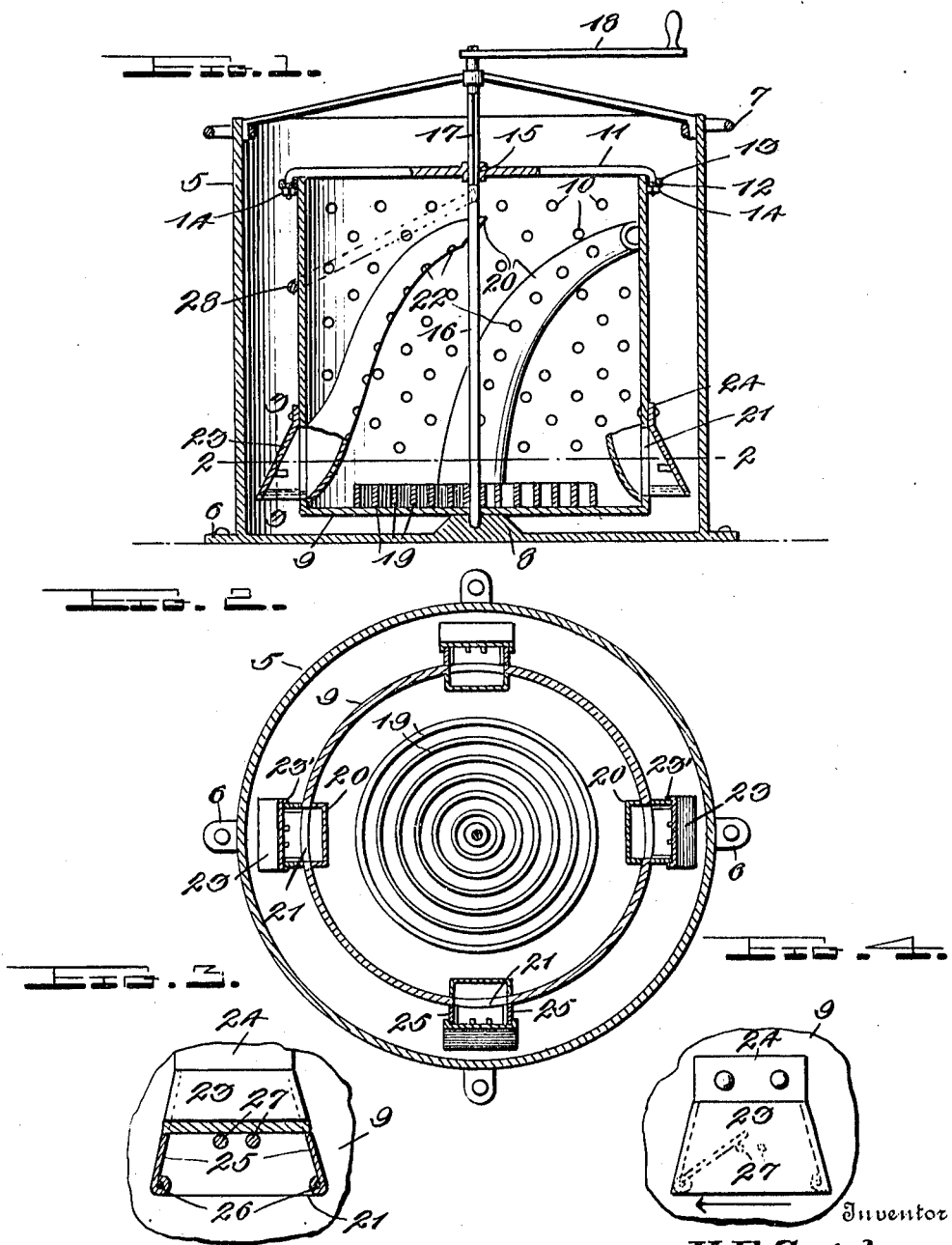

UNITED STATES PATENT OFFICE.

HENRY F. SMITH, OF PITTSBURG, KANSAS.

DISH-WASHING MACHINE.

1,020,932.  Specification of Letters Patent.  Patented Mar. 19, 1912.

Application filed December 6, 1911. Serial No. 664,254.

*To all whom it may concern:*

Be it known that I, HENRY F. SMITH, a citizen of the United States, residing at Pittsburg, in the county of Crawford and State of Kansas, have invented certain new and useful Improvements in Dish-Washing Machines, of which the following is a specification, reference being had to the accompanying drawings.

This invention relates to dish washing machines and has for its primary object to provide a simple, efficient and inexpensive device of this character whereby the dishes may be quickly and thoroughly washed or cleansed.

A further object of the invention resides in the provision of improved means for forcibly discharging the water against the dishes which are contained within a suitable receptacle.

Another object of the invention is to provide a dish container rotatably mounted within a water vessel, said container having foraminated walls and dish supporting means upon its bottom, spiral water directing tubes arranged upon the annular wall of the container, and means arranged upon the exterior of said container to direct the water into said tubes when the container is rotated in either direction.

With the above and other objects in view, the invention consists of the novel features of construction, combination and arrangement of parts hereinafter fully described and claimed, and illustrated in the accompanying drawings, in which—

Figure 1 is a vertical section of a dish washing machine embodying my improvements; Fig. 2 is a section taken on the line 2—2 of Fig. 1; Fig. 3 is a detail section taken on the line 3—3 of Fig. 1; and Fig. 4 is a detail fragmentary elevation of the dish receptacle or container.

Referring in detail to the drawing 5 designates a vessel preferably cylindrical in form and provided with a plurality of supporting legs 6. This vessel may also be provided at its upper edge and on opposite sides with a handle 7. A bearing 8 is centrally arranged within said vessel and rigidly secured to the bottom thereof. Within this outer vessel the dish container or receptacle 9 is arranged, the side and bottom walls of said container being provided with a plurality of perforations 10 to admit water to the interior thereof. A spider 11 is removably secured upon the upper edge of this container, the arms thereof being angularly disposed and provided with threads as indicated at 12. These threaded extremities of the spider arms are adapted to be disposed through openings in the lugs 13 secured to the annular wall of the receptacle 9 and nuts 14 are threaded thereon to rigidly secure the spider in position. This spider is further provided with a central rectangular opening 15 to receive the squared portion 17 of a rod or shaft 16. The lower end of this rod or shaft extends through a central opening in the bottom of the receptacle 9 and is seated in a bearing recess provided in the block 8, said bearing block also serving to space the bottom of the dish receptacle from the bottom of the outer vessel 5. To the upper end of the shaft 16 a crank handle 18 is attached whereby the receptacle 9 may be rotated.

Within the dish receptacle and upon the bottom thereof a plurality of annular bands or rings 19 are arranged and rigidly secured. These bands or rings are arranged in pairs and the dishes are supported in a vertical position within the receptacle by placing the edges thereof between the spaced bands of each pair. In this manner a large number of dishes may be arranged within the vessel and their surfaces spaced or separated so that the water may contact with all portions thereof. Upon the inner face of the annular wall of the receptacle 9 a plurality of semicircular tubes 20 are spirally arranged. The upper ends of these tubes are open to discharge the water downwardly, and the lower ends thereof are enlarged and disposed over the openings 21 in the annular wall of the receptacle, said tubes being rigidly secured to the inner face of said wall. The tubes 20 are also provided with a longitudinal series of openings 22 through which the water is discharged in jets as the receptacle is rotated.

In order to cause the water to enter the lower ends of the tubes with sufficient force to move upwardly therein and be discharged from the upper ends of the tubes, I provide directing means arranged upon the exterior of the annular wall of said receptacle. This directing means consists of a hood 23 which is provided with a flange 24 rigidly secured in any desired manner to the outer face of the wall of the receptacle. The body plate of the hood is outwardly and downwardly inclined and the ends 25 thereof are loosely mounted upon the wires or rods 26 which are rigidly fixed in the ends of the body plate and the wall of the receptacle 9. Pins 27 are secured in the hood plate and extend inwardly, said pins being located adjacent to each end of said plate. By means of this construction, the water is caused to enter the lower ends of the directing tubes 20 under considerable pressure.

As shown in Fig. 4, when the receptacle is being rotated in the direction indicated by the arrow, the plate 25 forming one end of the hood is moved inwardly by the pressure of water thereagainst and rests upon one of the pins 27 in an inclined position as shown in dotted lines in said figure. The water entering the end of the hood over this inclined plate, is directed upwardly into the lower end of the tube 20 as the receptacle is rapidly rotated within the vessel 5. When the direction of rotation is reversed, the plate 25 will return to its normal position while the other of said plates in the opposite end of the hood will move downwardly upon the supporting pin 27. The ends of the inclined hood plate 23 are inwardly flanged as indicated at 23' to limit the outward movement of the plates 25. The plate 25 being inclined when in its closed position will also serve to increase the volume of water entering the tube 20. As this water moves upwardly through the tubes, it is discharged through the openings 22 between and against the plates arranged within said vessel. The larger part of this water is, however, discharged from the upper ends of said tubes and in the rotation of the receptacle sprays the same over the dishes. In this manner it will be seen that the water is forcibly discharged in volume against the dishes so that all parts thereof are quickly and thoroughly cleaned. The upper end of the receptacle or container 9 is preferably provided with a bail 28 so that the same may be readily removed from the outer vessel 5 when the washing of the dishes is completed. The water will drain from the dishes through the openings in the bottom of the receptacle and the hot air which is held between the spaced pairs of supporting plates or bands 19 will quickly dry the dishes as it rises through the interior of the container.

From the foregoing it is thought that the construction and manner of operation of my improved dish washing machine will be fully understood.

The device is comparatively simple in construction and provides means whereby dishes may be quickly washed in large quantities.

As the device is entirely constructed of sheet metal, it will further be obvious that the same can be manufactured at small cost.

While I have shown and described the preferred construction and arrangement of the various elements, it will be understood that the invention is susceptible of a great many minor modifications without departing from the essential feature or sacrificing any of the advantages thereof.

Having thus described the invention what is claimed is:—

1. In a dish washing machine, a water containing vessel, a receptacle for the dishes rotatably mounted in said vessel, the annular wall of said receptacle having a plurality of openings adjacent to its lower edge, tubes spirally arranged upon the inner face of said wall and having their lower ends disposed over said openings, the upper ends of said tubes being open to discharge water upon the contents of the receptacle, and means movably mounted upon the outer face of said annular wall and moved by the pressure of water thereagainst to forcibly direct the water into the lower ends of said tubes.

2. In a dish washing machine, a water containing vessel, a receptacle to receive the dishes rotatably mounted in said vessel, the annular wall of said vessel having a plurality of openings adjacent to its lower edge, tubes spirally arranged upon the inner face of said annular wall and having their lower ends disposed over the openings thereof, the upper ends of said tubes being open to discharge the water upon the contents of said receptacle, means arranged upon the outer face of said annular wall over each of the openings therein to forcibly direct the water into the lower ends of said tubes, said means consisting of an outwardly and downwardly inclined plate, and movable directing plates mounted between the ends of said inclined plate and the wall of the receptacle and movable by the pressure of water against the same to direct the water into the lower ends of said tubes when the receptacle is rotated in either direction.

3. In a dish washing machine, a water containing vessel, a receptacle rotatably mounted within said vessel to receive the dishes, means secured upon the base of said receptacle to support the dishes in an upright position and in separated relation, the annular wall of said receptacle being provided with openings adjacent its lower end, tubes arranged upon the inner face of said annular wall and having their lower ends disposed over the face of said openings, the upper ends of said tubes being open to discharge water upon the contents of the receptacle, said tubes each being further provided with a longitudinal series of openings to discharge the water in jets between the dishes, and means arranged upon the outer face of the annular wall of said receptacle to forcibly direct the water into the lower ends of said tubes, said means consisting of an outwardly and downwardly inclined plate, inwardly projecting pins secured to said plate adjacent each of its ends, and directing plates pivotally mounted between the ends of said inclined plate and the wall of the receptacle and adapted to be supported in an inclined position by said pins whereby the water is forcibly directed into the lower ends of said tubes in the rotation of the receptacle in either direction.

In testimony whereof I hereunto affix my signature in the presence of two witnesses.

HENRY F. SMITH.

Witnesses:
R. T. METZER,
BEN ROLOFF.